United States Patent [19]
Behrens et al.

[11] Patent Number: 5,360,303
[45] Date of Patent: Nov. 1, 1994

[54] DEVICE FOR LOCKING A NUT ON A BOLT

[75] Inventors: Guenter Behrens, Stuhr; Wilfried Ellmers, Achim, both of Germany

[73] Assignee: Deutsche Aerospace Airbus GmbH, Hamburg, Germany

[21] Appl. No.: 85,757

[22] Filed: Jun. 30, 1993

[30] Foreign Application Priority Data

Jul. 1, 1992 [DE] Germany ............................ 4221250

[51] Int. Cl.$^5$ ............................................ F16B 39/10
[52] U.S. Cl. .................................. 411/120; 411/200; 411/945
[58] Field of Search ............... 411/120, 200, 513, 514, 411/515, 945, 119

[56] References Cited

U.S. PATENT DOCUMENTS

| | | | |
|---|---|---|---|
| 1,787,114 | 12/1930 | Lelean et al. | 411/945 X |
| 2,365,433 | 12/1944 | Polizzi | 411/945 X |
| 5,080,544 | 1/1992 | Bruyere | 411/120 |
| 5,207,543 | 5/1993 | Kirma. | |

FOREIGN PATENT DOCUMENTS

| | | | |
|---|---|---|---|
| 706190 | 6/1931 | France | 411/200 |
| 730803 | 8/1932 | France | 411/200 |
| 1091159 | 4/1955 | France | 411/200 |

Primary Examiner—Neill R. Wilson
Attorney, Agent, or Firm—W. G. Fasse; W. F. Fasse

[57] ABSTRACT

A nut lock or locking cap secures a nut on a bolt so that the nut cannot loosen itself and so that the nut cannot fall off the bolt. For this purpose the nut lock has a first ring section that at least partially surrounds the bolt and a second ring section that at least partially surrounds the nut. The two ring sections are interconnected by a radially extending flange, whereby the first ring section has a smaller diameter than the diameter of the second ring section. The first ring section has at least one through-hole that can be aligned with a cross-bore in the bolt for the insertion of a locking pin. The second ring section has radially inwardly facing profiled surfaces that enter into a form-locking, force-transmitting connection with the outer profile of the nut.

18 Claims, 2 Drawing Sheets

DEVICE FOR LOCKING A NUT ON A BOLT

FIELD OF THE INVENTION

The invention relates to a locking cap for securing a nut on a bolt to prevent relative rotation between the nut and the bolt.

BACKGROUND INFORMATION

It is known to secure a nut to a bolt by providing through-holes in the nut and bolt and inserting a locking pin, such as a cotter pin, that passes through the nut and through the bolt. It is also known to pass such a locking pin only through the bolt, but not through the nut. Both ways are practical, but have their disadvantages.

Where the locking pin passes through the nut and through the bolt it is necessary to produce the through-bore after the nut has been tightened. In most instances this production of the through-going bore is cumbersome, since the completed nut and bolt connection may not easily be accessible. Further, keeping the hole in the nut in alignment with the hole through the bolt is a problem and attempts at realignment may actually loosen the nut.

In the instance where the locking pin passes only through the bolt and not through the nut, it is assured that the nut cannot fall off the bolt. However, loosening of the nut is not necessarily prevented. Such loosening of the nut is undesirable. U.S. Pat. No. 5,207,543 (Kirma), issued on May 4, 1993, describes a nut lock in which a helical spring is so configured that a portion of the spring holds the nut while an end leg passes through a cross-bore in the bolt. The arrangement is such that a nut tightening torque moment is exerted on the nut when the locking spring is in place. The just described device is effective for its purpose, but leaves room for improvement, especially with regard to the variability of the relative position of the locking member to the nut.

OBJECTS OF THE INVENTION

In view of the foregoing, it is the aim of the invention to achieve the following objects singly or in combination:

to construct a nut lock in such a manner that the nut will be held on the bolt against loosening and against becoming lost while simultaneously permitting numerous relative positions between the nut lock and the nut;

to construct the nut lock, also referred to herein as safety cap, in such a manner that the manufacture of such safety caps is substantially simplified as compared to the prior art, whereby costs for such nut locks or safety caps are reduced;

to construct the safety cap in such a manner that effective torque moments and forces are uniformly distributed; and to provide the safety cap with radially inwardly facing locking elements, such as grooves and ridges, which have an on-center spacing from one another or so-called pitch, that is substantially smaller than a respective pitch established by the outer profile of the nut to be locked on its bolt.

SUMMARY OF THE INVENTION

The safety cap according to the invention has two ring sections interconnected by a shoulder or flange section. One ring section encircles at least portions of the circumference of the nut while the other ring section surrounds at least partially the bolt to which the other ring section is secured with a locking pin passing through at least one hole in the other ring section and through the bolt. The inwardly facing surfaces of the nut encircling section are provided with a profile that engages an outer profile of the nut in a form-locking force-transmitting manner, whereby the form fit can be established in numerous relative positions between the safety cap and the nut.

The just enumerated features of the invention make it possible to set the safety cap onto the end of the threaded bolt and to secure the safety cap to the bolt while simultaneously having the possibility of selecting any one of numerous positions that may be established in a form-fitting manner between one ring section of the safety cap and the nut. Thus, it is now possible to provide the threaded end of the bolt with one or more holes, e.g. through holes without regard to the subsequent position of a nut on the bolt. Further, subsequent to the production of the through-hole or dead-end hole in the bolt, the screw connection can be made by tightening the nut on the bolt in a substantial, wide range. The number of possible relative positions between the safety cap and the nut depends on the above mentioned pitch of the profile on the inwardly facing surfaces of the nut engaging ring section and of the profile of the nut. The finer the profile on the ring section, the more relative positions between cap and nut are available. It has been found that the elasticity of the bolt and nut in combination with the possible substantial number of relative positions, satisfies all practical requirements.

In a preferred embodiment, each of the two ring sections comprises three circumferentially spaced ring segments extending around the bolt and nut respectively, whereby uniform spacings from one ring segment to the other in the circumferential direction are preferred. The nut itself is thus made visible through the spacings so that the setting of the safety cap onto the bolt and nut is facilitated.

In a preferred embodiment the radially inwardly facing profiles of the cap ring section comprise valleys and ridges forming a flute-type construction for engaging a respectively, but coarser profile of the nut which also has projections and recesses for engagement of corresponding projections and recesses on the inwardly facing surface of the ring section that engages the nut. As mentioned, the pitch or on-center spacing of the ridges and valleys on the inner surface of the ring section engaging the nut should be substantially smaller or finer than corresponding spacings on the outwardly facing profile of the nut. A uniform force introduction and moment distribution is assured if holes passing through the ring section surrounding the bolt are arranged opposite each other, whereby an axis common to both holes extends radially and perpendicularly to the longitudinal bolt axis.

In another preferred embodiment the number of ring segments that encircle the bolt can be increased to six without any manufacturing difficulties. In such an embodiment three pairs of holes are provided in these six ring segments and these holes are also preferably aligned relative to each other in pairs. In other words, two holes forming a pair are positioned diametrically opposite each other. In this embodiment, the bolt still requires but one through-hole and the safety cap may be attached through any one of its three pairs of holes through which the respective locking pin passes. Such an embodiment increases the variability of the relative positions of the safety cap relative to the bolt and to the nut. Preferably, the bolt is provided with but one through-hole which assures a high mechanical strength, yet provides the required variability for all practical purpose.

Preferably, the two ring sections are arranged on respective circles, whereby the circle of the ring section encircling the bolt has a smaller diameter than the diameter of the circle of the ring section encircling the nut. Such a construction results in a compact safety cap.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
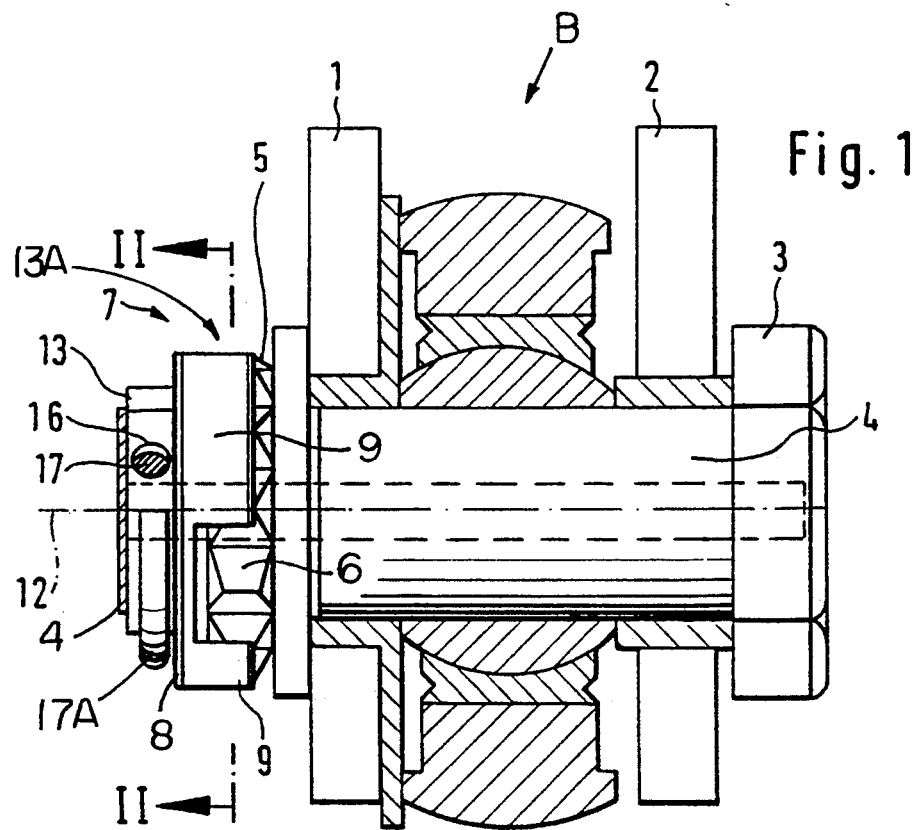
FIG. 1 is a side view, partially in section, of a nut and bolt connection with a nut lock or safety cap according to the invention, which secures the nut in a fixed position to the bolt against loosening and against falling off the bolt.
Figure 3:
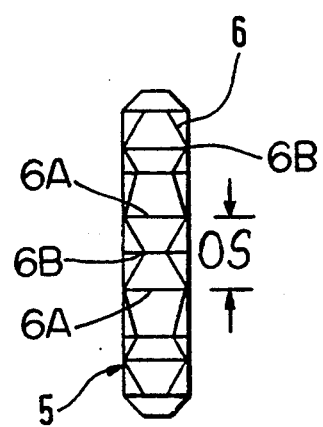
FIG. 3 is a side view of a nut according to the invention.

FIG. 1 shows a bearing B mounted between two structural components 1 and 2 with the aid of a nut and bolt connection including a bolt 4 with a head 3 and a nut 5. According to the invention the nut 5 is held in its tightened position on the threaded end 4A of the bolt by a safety cap 7 which engages an outer profile 6 on the nut 5 as will be described in more detail below. As shown in FIG. 3, the nut 5 with its profile 6 has ridges 6A and valleys 6B with a respective on-center spacing OS, also referred to as a pitch which is relatively coarse compared to a respective pitch on a cooperating profile on the safety cap as will be explained in more detail below.

The safety cap 7 of the invention comprises a first ring section 13 that encircles the threaded end 4A of the bolt 4 either completely or partly, and a second ring section 13A that encircles the nut partly or entirely. The ring sections 13 and 13A are interconnected by a flange 8, whereby the first ring section 13 has a smaller diameter than the diameter of the second ring section 13A.

Figure 2:
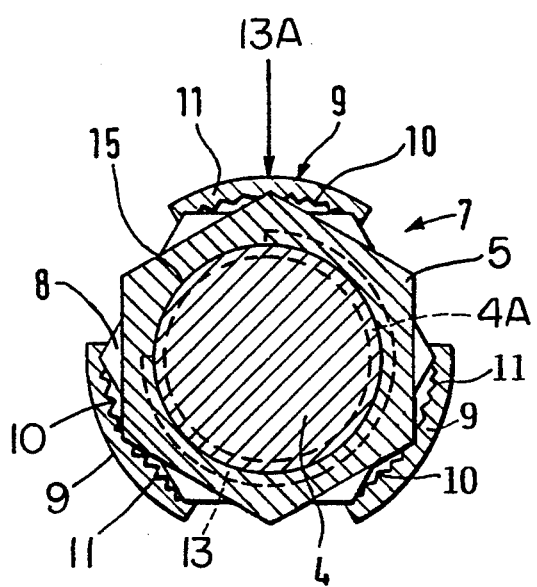
FIG. 2 is a sectional view along section line II—II in FIG. 1.

FIGS. 1 and 2 further show that the second ring section 13A is divided into a number of locking ring segments 9 while the first ring section 13 has only one ring segment extending over 270°, e.g. A locking pin 17 extends partly into or entirely through a cross-bore 16 in the end of the bolt 4. The cross-bore 16 may be a dead-end hole when the pin 17 extends only partly into the bolt 4 or it may be a through-bore for the pin 17 to extend entirely through the bolt 4. The pin 17 may have a circular configuration as shown at 17A with a radial leg extending into or through the bore 16.

FIG. 2 shows that the second ring section 13A that encircles the nut 5 either completely or partly, comprises, for example, three locking ring segments 9 for partly encircling the nut 5. Preferably, the ring segments are so dimensioned and spaced from each other in the circumferential direction that uniform spacings are provided from one ring segment to the next in the circumferential direction. FIG. 2 also shows that the flange 8 which connects the first ring section 13 with the second ring section 13A does not have to be round. The shown flange 8 is, for example hexagonal. The flange 8 has a through-hole 15 that is axially aligned with the threaded hole in the nut 5 through which the threaded end 4A of the bolt 4 extends. The flange 8 is connected at least at two corners to each of the locking segments 9 radially outwardly while the through-hole 15 is surrounded by the first ring section 13 which covers, for example 270° or which may be divided into several ring segments, for example three or six. The first ring section 13 may also cover 360° if desired. Similarly, the second ring section 13A may be a fully closed ring or may comprise a plurality of locking ring segments such as shown at 9 in the drawings. FIG. 2, for example, shows three such locking ring segments 9 having inwardly facing locking profiles. Each ring segment 9 has the same dimension in the circumferential direction as best seen in FIG. 2. Similarly, all circumferential spacings between neighboring ring segments are also the same.

Figure 4:
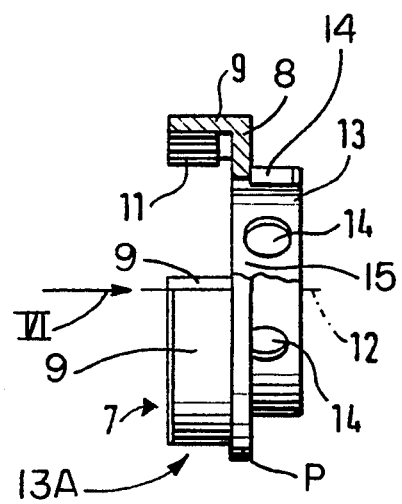
FIG. 4 is a side view partially in section of the safety cap according to the invention.
Figure 5:
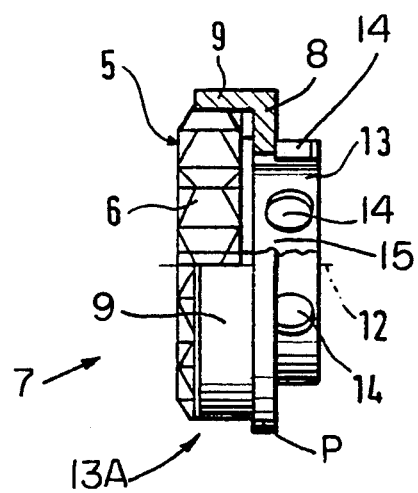
FIG. 5 is a side view similar to that of FIG. 4, but showing the safety cap attached to a nut.
Figure 6:
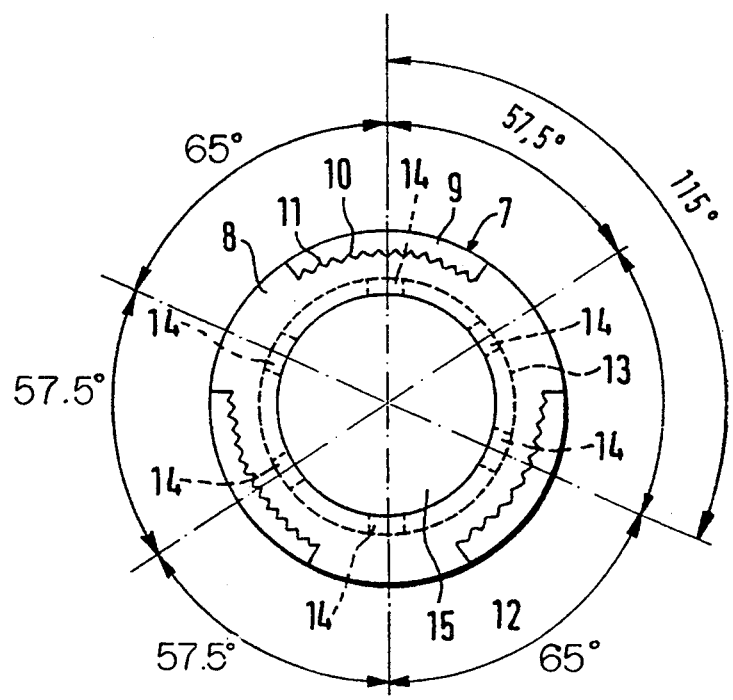
FIG. 6 is a plan view onto a safety cap according to the invention in the direction of the arrow VI in FIG. 4.

Referring to FIGS. 4 and 5, the safety cap 7 according to the invention has at least one hole 14 in the first ring section 13. As shown, there are six such holes 14 as best seen in FIG. 6. The locking pin 17 fits through any of these holes 14 and engages the cross-bore 16 in the end of the bolt 4 as shown in FIG. 1.

FIG. 6 shows that the holes 14 in the first ring section 13 are not uniformly distributed around the circumference of the ring section 13. There are four circumferential spacings of 57.5° and two such spacings of 65° between neighboring holes These spacings provide an improved variability in the positioning of the safety cap or nut lock 7 relative to the bolt 4. These different circumferential spacings permit a smaller rotational turn or a larger rotational turn of the nut for tightening. It should be mentioned here that the through-bore 15 through the safety cap 7 has an inner diameter that is slightly larger than the outer diameter of the bolt 4. In operation, once the nut 5 has been screwed onto the threaded end 4A of the bolt 4, the safety cap 7 is placed onto the nut 5 as shown in FIG. 5. The handling of the safety cap 7 is facilitated by providing the flange 8 at least partially around the circumference with a projection P extending radially outwardly and helping in holding the safety cap 7 and pushing it onto the bolt 4 or removing it from the bolt 4. The cap is so positioned that one of the holes 14 is aligned with the cross-bore t6 in the end of the bolt 4 as shown in FIG. 1. Thus, the locking pin 17 can be inserted through the aligned hole and bore. The position of the safety cap 7 relative to the nut 5 in the direction of the longitudinal axis 12 results from the particular fixed position. In other words, the locking ring segments 9 do not have to fully enclose the nut 5. Rather, the nut may project to some extent from the cap as seen in FIG. 5. For this purpose, the axial dimension of the nut and the axial dimension of the second ring section 13A may be selected as needed. The just mentioned axial dimensions in the direction of the axis 12 can be relatively small where narrowly defined positional changes between the nut 5 and the bolt 4 are to be met. On the other hand, where a larger axial displacement of the nut is to be permissible, the axial dimensions must be correspondingly larger.

Although the invention has been described with reference to specific example embodiments it will be appreciated that it is intended to cover all modifications and equivalents within the scope of the appended claims.

What we claim is:

1. A device for locking a nut on a bolt, comprising a bolt having a threaded end, a threaded nut on said bolt, a safety cap on said nut and bolt for holding said nut in a fixed position on said threaded bolt end, said safety cap comprising a first ring section at least partly surrounding said threaded bolt end, a second ring section at least partly surrounding said threaded nut, and a flange section connecting said first ring section to said second ring section, said second ring section comprising a radially inwardly facing profiled surface engaging said nut in a form-fitting manner, said first ring section having at least one hole therein, said threaded end of said bolt having a cross-bore therein, said device further comprising a locking pin extending through said hole into said cross-bore of said bolt for securing said safety cap to said bolt against relative rotation between said bolt and said safety cap, and wherein said second ring section comprises a number of locking ring segments circumferentially spaced from each other around said nut, each of said locking ring segments having said radially inwardly facing profiled surface for engaging said nut in a force transmitting manner.

2. The device of claim 1, wherein each of said first and second ring sections comprises a number of ring segments circumferentially spaced from each other around said threaded bolt end so that uniform spacings between neighboring ring segments are provided in the circumferential direction, and wherein all ring segments have the same circumferential ring segment dimension.

3. The device of claim 2, wherein said first ring section comprises at least three ring segments circumferentially spaced from each other around said threaded bolt end.

4. The device of claim 1, wherein said second ring section comprises three locking ring segments each having said radially inwardly facing profiled surface.

5. The device of claim 1, wherein said radially inwardly facing profiled surface comprises ridges (10) and valleys (11) having on-center spacings from each other which define a pitch that is substantially smaller than a pitch defined by an outer profile of said nut.

6. The device of claim 1, wherein said first ring section comprises at least two of said holes (14) arranged diametrically opposite each other.

7. The device of claim 6, wherein said diametrically opposed holes have a common axis intersecting a longitudinal axis of said bolt.

8. The device of claim 1, wherein said first ring section comprises six of said holes arranged in pairs so that holes of a pair are positioned diametrically opposite each other.

9. The device of claim 1, wherein said threaded bolt has at least one of said cross-bores into which said locking pin extends to secure said safety cap against rotation relative to said bolt.

10. The device of claim 1, wherein said first ring section has a diameter smaller than said second ring section.

11. The device of claim 1, wherein said cross-bore in said bolt is a through-bore extending entirely through said bolt.

12. A nut lock, comprising a safety cap for engaging a bolt and a nut on said bolt for holding said nut in a fixed position, said safety cap comprising a first ring section for at least partly surrounding a bolt end, a second ring section for at least partly surrounding said nut, and a flange section connecting said first ring section to said second ring section, said second ring section comprising a radially inwardly facing profiled surface for engaging said nut in a form-fitting, force transmitting manner, said first ring section having at least one hole therein for a locking pin that is adapted to pass through said at least one hole and into a cross-bore in said bolt, and wherein said second ring section comprises a number of locking ring segments circumferentially spaced from each other around said nut, each of said locking ring segments having said radially inwardly facing profiled surface for engaging said nut in a force-transmitting manner.

13. The nut lock of claim 12, wherein each of said first and second ring sections comprises a number of ring segments circumferentially spaced from each other around said threaded bolt so that uniform spacings between neighboring ring segments are provided in the circumferential direction, and wherein all ring segments have the same circumferential ring segment dimension.

14. The nut lock of claim 13, wherein said first ring section comprises at least three ring segments circumferentially spaced from each other around said threaded bolt end.

15. The nut lock of claim 12, wherein said second ring section comprises three locking ring segments each having said radially inwardly facing profiled surface.

16. The nut lock of claim 12, wherein said radially inwardly facing profiled surface comprises ridges (10) and valleys (11) having on-center spacings from each other which define a pitch that is substantially smaller than a pitch defined by an outer profile of said nut.

17. The nut lock of claim 12, wherein said first ring section comprises six of said holes (14) arranged so that two holes forming a pair are positioned diametrically opposite each other, and wherein there are four circumferential spacings of 57.5° each and two circumferential spacings of 65° each between neighboring holes (14) for an increased variability in the positioning of said nut lock relative to said bolt.

18. The nut lock of claim 1, wherein said first ring section has a diameter smaller than said second ring section.

* * * * *